United States Patent
Shimatani et al.

(10) Patent No.: US 8,905,546 B2
(45) Date of Patent: Dec. 9, 2014

(54) OPTICAL SYSTEM

(75) Inventors: Takafumi Shimatani, Osaka (JP); Shigeto Yoshida, Osaka (JP); Kentarou Imamura, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 351 days.

(21) Appl. No.: 13/503,860

(22) PCT Filed: Oct. 26, 2010

(86) PCT No.: PCT/JP2010/068966
§ 371 (c)(1),
(2), (4) Date: Apr. 25, 2012

(87) PCT Pub. No.: WO2011/052588
PCT Pub. Date: May 5, 2011

(65) Prior Publication Data
US 2012/0268640 A1    Oct. 25, 2012

(30) Foreign Application Priority Data

Oct. 28, 2009  (JP) ................. 2009-248265

(51) Int. Cl.
*G03B 21/00* (2006.01)
*G03B 21/28* (2006.01)
*G02B 27/22* (2006.01)
*G02F 1/1335* (2006.01)
*G02B 5/04* (2006.01)

(52) U.S. Cl.
CPC ............ *G02B 5/04* (2013.01); *G02F 1/133524* (2013.01); *G02B 27/2235* (2013.01); *G02F 1/133553* (2013.01)
USPC .................. 353/10; 353/99; 359/479

(58) Field of Classification Search
CPC .... G02B 27/2292; G02B 5/136; G02B 5/124; G03B 21/28; H04N 13/0488

USPC ........... 353/98, 99, 77, 78, 10; 359/478, 479, 359/459; 348/44; 472/58, 61, 63
See application file for complete search history.

(56) References Cited

U.S. PATENT DOCUMENTS 8,434,872 B2 * 5/2013 Maekawa ................. 353/10
2006/0033972 A1  2/2006 Takemori et al.
(Continued)

FOREIGN PATENT DOCUMENTS

| JP | 2004-102075 A | 4/2004 |
|---|---|---|
| JP | 2004-248231 A | 9/2004 |

(Continued)

OTHER PUBLICATIONS

International Preliminary Report on Patentability dated Jun. 21, 2012.

(Continued)

*Primary Examiner* — William C Dowling
*Assistant Examiner* — Ryan Howard
(74) *Attorney, Agent, or Firm* — Harness, Dickey & Pierce, P.L.C.

(57) ABSTRACT

An optical system includes: a reflective imaging element; and a liquid crystal display panel disposed on a light-incident side of the reflective imaging element, the liquid crystal display panel having a display surface which is inclined with an angle of no less than 45° and no more than 75° relative to a plane defined by the reflective imaging element, a viewing angle dependence of a contrast ratio of the liquid crystal display panel taking a central value in a direction inclined by 10° or more in a direction of tilt of the display surface from a normal of the display surface, and causes an image displayed on the display surface of the liquid crystal display panel to form an image at a position of planar symmetry with respect to the reflective imaging element as a plane of symmetry.

6 Claims, 5 Drawing Sheets

(56) References Cited

U.S. PATENT DOCUMENTS

| | | |
|---|---|---|
| 2009/0310231 A1 | 12/2009 | Maekawa |
| 2010/0110384 A1* | 5/2010 | Maekawa .................. 353/10 |
| 2010/0214394 A1 | 8/2010 | Maekawa |

FOREIGN PATENT DOCUMENTS

| | | | |
|---|---|---|---|
| JP | 2008-158114 A | 7/2008 | |
| JP | 2009-075483 A | 4/2009 | |
| JP | 2009-134087 A | 6/2009 | |

OTHER PUBLICATIONS

Yamahara, M. et al., "Technology of the GRP Formula for Wide-Viewing-Angle LCDs", Sharp Technical Journal, Apr. 2003, pp. 19-23, No. 85.

International Search Report PCT Form PCT/ISA/210.

* cited by examiner

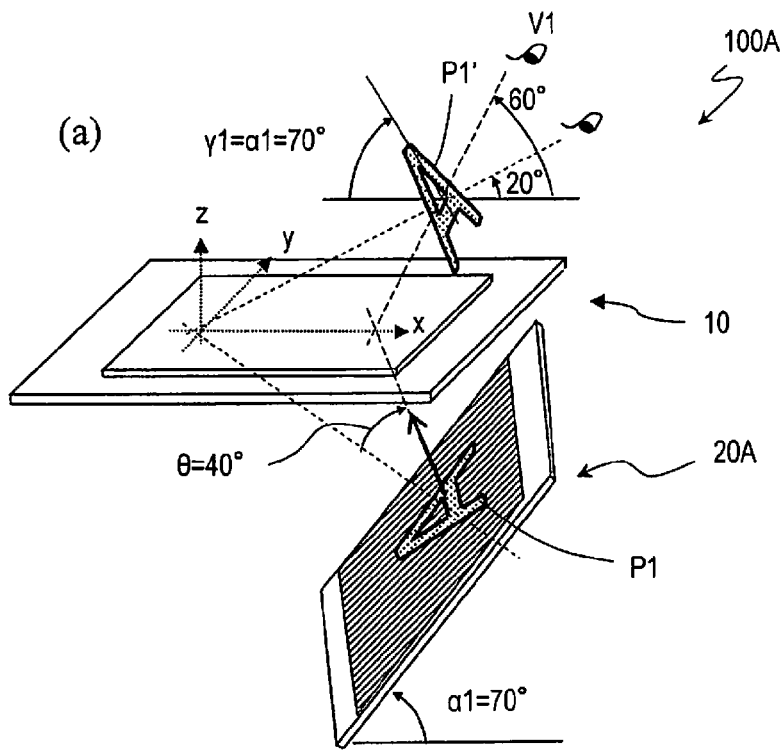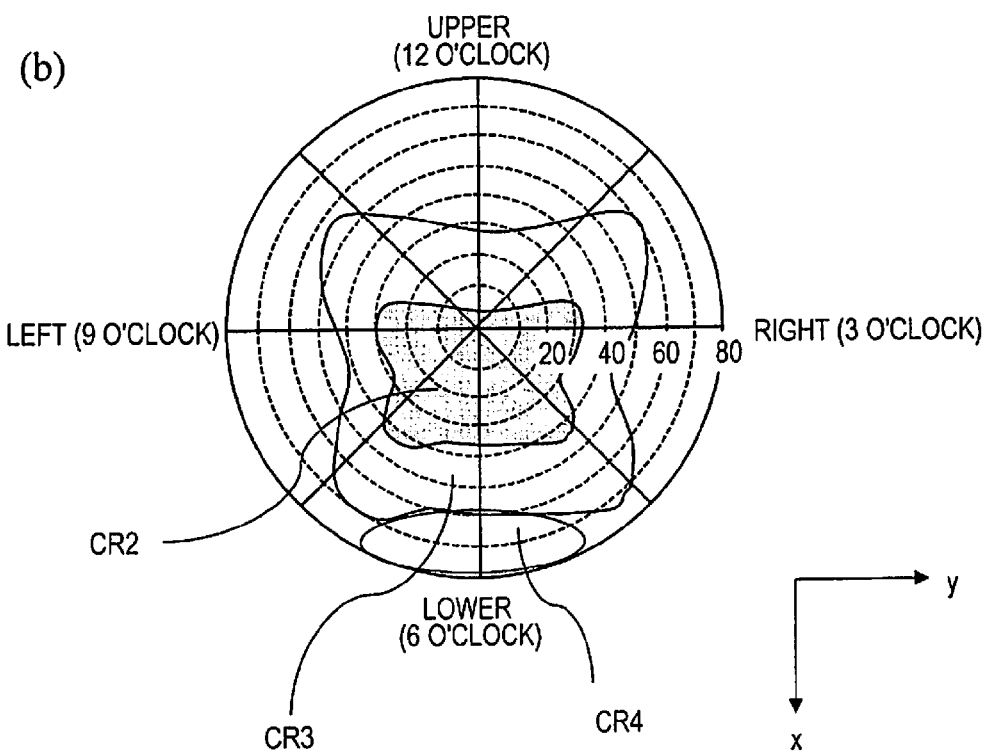
FIG. 1

FIG. 3
(a)
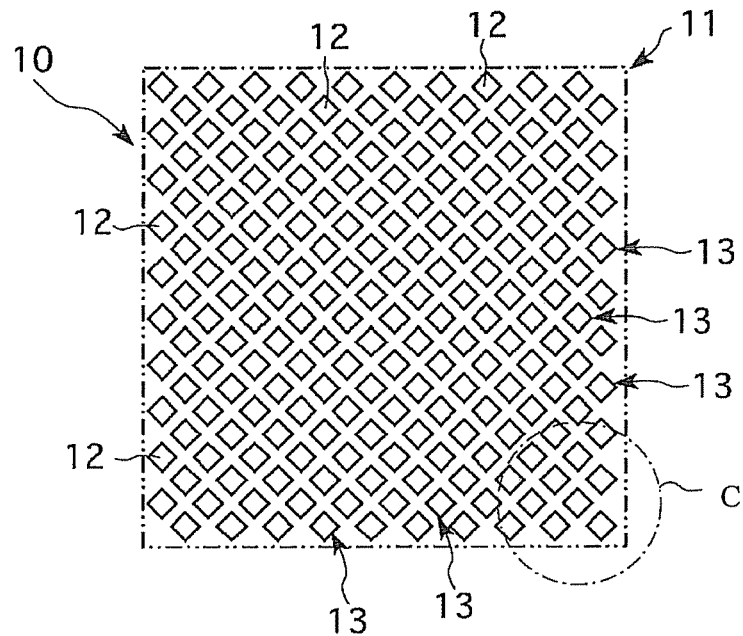
(b)
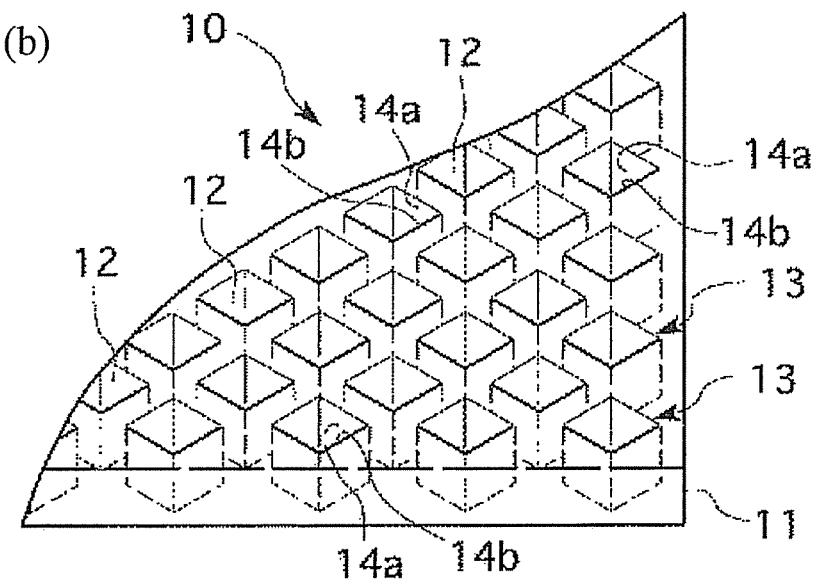

FIG.5
(a)
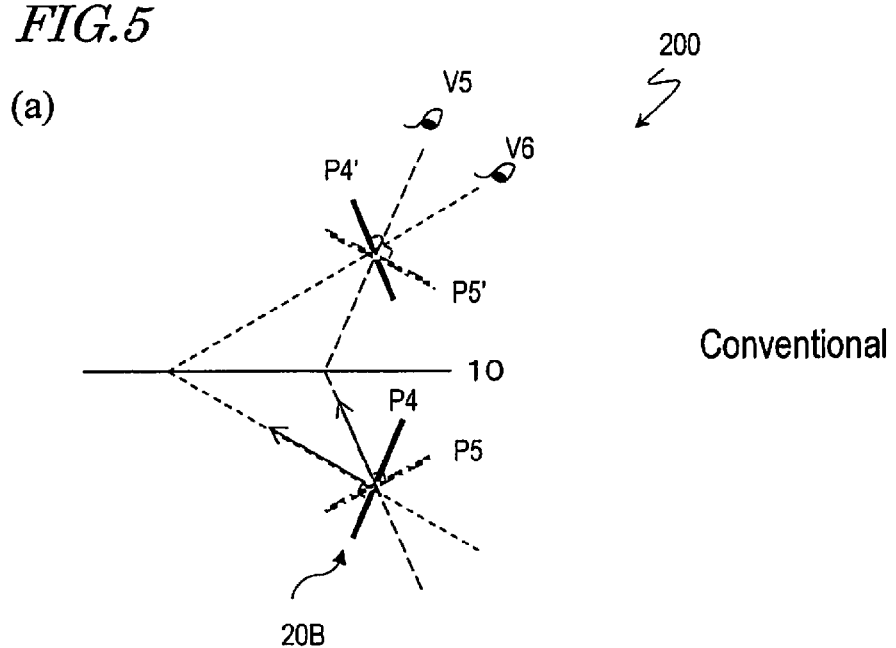
Conventional
(b)
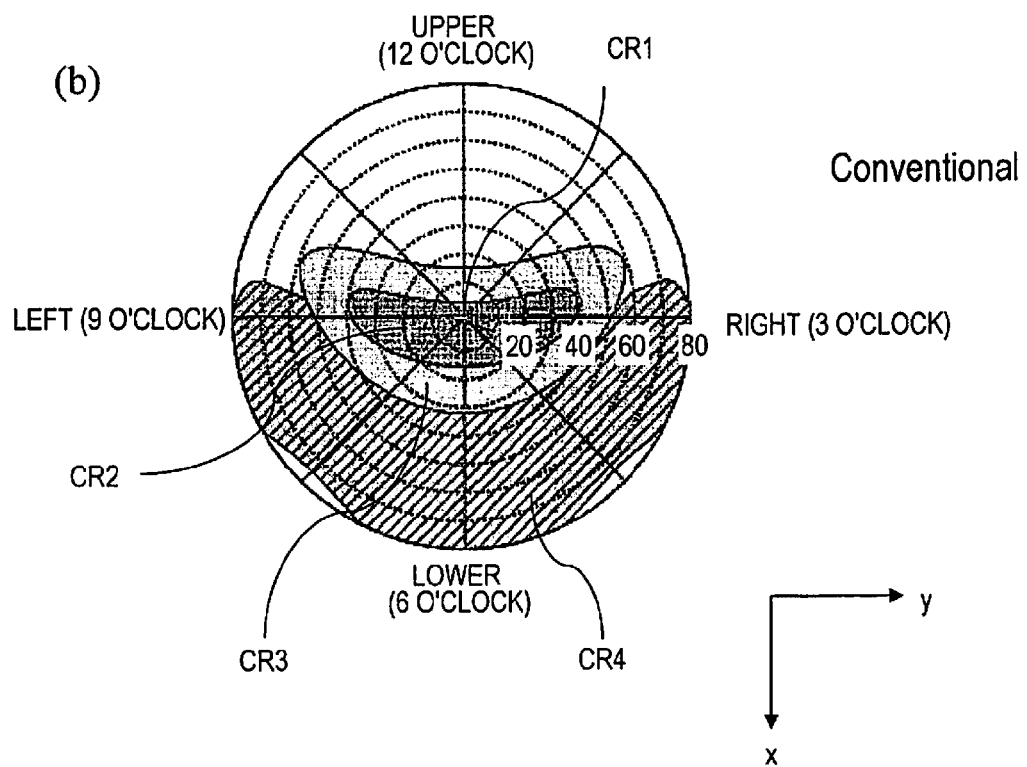
Conventional

OPTICAL SYSTEM

TECHNICAL FIELD

The present invention relates to an optical system having a reflective imaging element capable of forming an image of an object in a space and a liquid crystal display panel.

BACKGROUND ART

In recent years, an optical system for forming an image of an object in a space by using a reflective imaging element has been proposed (for example, Patent Documents 1 and 2). The optical system includes a reflective imaging element and an object, and an image to be displayed in a space is an image of the object, which forms at a position of planar symmetry with respect to the reflective imaging element as a plane of symmetry. This optical system utilizes specular reflection of the reflective imaging element, and, according to its principles, the ratio in size between the image of the object and the image appearing in the space is 1:1.

Disclosed as the reflective imaging element are: those featuring holes penetrating a plate-like substrate in the thickness direction, with an optical element (also referred to as a unit imaging element) composed of two orthogonal specular elements provided on the inner walls of each hole (e.g., see FIG. 4 of Patent Document 1); and those featuring a plurality of transparent cylindrical bodies protruding in the thickness direction of a substrate, with an optical element composed of two orthogonal specular elements provided on the inner wall surfaces of each cylindrical body (e.g., see FIG. 7 of Patent Document 1).

In the reflective imaging elements disclosed in Patent Documents 1 and 2, tens to hundreds of thousands of square holes, each of whose sides measures about 50 μm to 200 μm, are formed in a substrate having a thickness of 50 μm to 200 μm, the inner surfaces of each hole being mirror coated by an electroforming technique, a nanoprinting technique, or a sputtering technique.

For reference sake, the entire disclosure of Patent Documents 1 and 2 is incorporated herein by reference.

CITATION LIST

Patent Literature

[Patent Document 1] Japanese Laid-Open Patent Publication No. 2008-158114
[Patent Document 2] Japanese Laid-Open Patent Publication No. 2009-75483

SUMMARY OF INVENTION

Technical Problem

In the aforementioned optical system, when an object is placed with a tilt relative to the reflective imaging element, the image (hereinafter referred to as an "aerial image") appearing in the air also becomes angled, thus producing an effect of an aerial image floating in the space. Moreover, as the tilting angle of the object relative to the reflective imaging element is increased, a more upright (i.e., closer to vertical) image is formed in the air, whereby an image with enhanced reality can be displayed.

When an image which is displayed on a display panel (e.g., a liquid crystal display panel) is used as the object, the image which is displayed on the display panel appears upright in the air. Therefore, even though the displayed image is a two-dimensional image, an aerial image would appear floating in the space to the viewer, thus resulting in a perception as if a three-dimensional image were being displayed in the air. In the present specification, an image which is perceived by a viewer as if a three-dimensional image were floating in the air in this manner may be referred to as an "airy image".

The inventors have prototyped an optical system capable of displaying an airy image by using a liquid crystal display panel, to find that there may be cases where an aerial image with a sufficient display quality (e.g., contrast ratio) cannot be displayed.

The present invention has been made in order to solve the above problems, and an objective thereof is to provide an optical system which is capable of displaying an airy image with a high display quality.

Solution to Problem

An optical system according to the present invention comprises: a reflective imaging element; and a liquid crystal display panel disposed on a light-incident side of the reflective imaging element, the liquid crystal display panel having a display surface which is inclined with an angle of no less than 45° and no more than 75° relative to a plane defined by the reflective imaging element, a viewing angle dependence of a contrast ratio of the liquid crystal display panel taking a central value in a direction inclined by 10° or more in a direction of tilt of the display surface from a normal of the display surface, wherein the optical system causes an image displayed on the display surface of the liquid crystal display panel to form an image at a position of planar symmetry with respect to the reflective imaging element as a plane of symmetry.

In one embodiment, an intensity distribution of displaying light going out from the liquid crystal display panel takes a maximum value in a direction which is inclined by 10° or more in the direction of tilt of the display surface from the normal of the display surface.

In one embodiment, the liquid crystal display panel is a TN liquid crystal display panel.

Another optical system according to the present invention comprises: a reflective imaging element; a liquid crystal display panel disposed on a light-incident side of the reflective imaging element, the liquid crystal display panel having a display surface which is inclined with an angle of no less than 15° and no more than 45° relative to a plane defined by the reflective imaging element, a viewing angle dependence of a contrast ratio of the liquid crystal display panel taking a central value in a normal direction of the display surface or in a direction inclined by more than 0° but less than 10° in a direction of tilt of the display surface from the normal direction; and a light guide element having an incident face, an outgoing face, and a plurality of light paths formed between the incident face and the outgoing face, the incident face being disposed on the reflective imaging element side of the display surface, and the outgoing face being inclined with an angle of no less than 45° and no more than 75° relative to the plane defined by the reflective imaging element, wherein the optical system causes an image displayed on the outgoing face of the light guide element to form an image at a position of planar symmetry with respect to the reflective imaging element as a plane of symmetry.

In one embodiment, the light guide element is a fiber plate.

In one embodiment, the liquid crystal display panel is a TN liquid crystal display panel.

Advantageous Effects of Invention

According to the present invention, an optical system which is capable of displaying an airy image with a high display quality is provided.

BRIEF DESCRIPTION OF DRAWINGS

FIG. 1 (a) is a schematic perspective view showing the construction of an optical system 100A according to an embodiment of the present invention; and (b) is an equicontrast-ratio line diagram showing the viewing angle characteristics of a liquid crystal display panel 20A included in the optical system 100A.

FIG. 3 A diagram showing the construction of a reflective imaging element 10 used in the optical system according to an embodiment of the present invention, where (a) is a schematic front view, and (b) is a schematic perspective view in which portion C in (a) is enlarged.

FIG. 5 A diagram for describing a problem of an optical system 200 (Comparative Example) having a conventional commonly-used liquid crystal display panel 20B, where (a) is a schematic side view showing the construction of the optical system 200, and (b) is an equicontrast-ratio line diagram showing the viewing angle characteristics of the commonly-used liquid crystal display panel 20B included in the optical system 200.

DESCRIPTION OF EMBODIMENTS

Hereinafter, embodiments of the present invention will be described with reference to drawings; however, the present invention is not limited to the illustrated embodiments.

Referring to FIGS. 1(a) and (b), the construction of an optical system 100A according to an embodiment of the present invention will be described. FIG. 1(a) is a schematic perspective view showing the construction of the optical system 100A, and FIG. 1(b) is an equicontrast-ratio line diagram showing the viewing angle characteristics of a liquid crystal display panel 20A included in the optical system 100A.

The optical system 100A shown in FIG. 1(a) includes a reflective imaging element 10 and a liquid crystal display panel 20A disposed on a light-incident side of the reflective imaging element 10. The reflective imaging element 10 has a construction as shown in FIG. 3, for example, and allows an image which is displayed on the display surface of the liquid crystal display panel 20A to form an image at a position of planar symmetry with respect to the reflective imaging element 10 as a plane of symmetry.

The liquid crystal display panel 20A is disposed so that its display surface is inclined with an angle of no less than 45° and no more than 75° relative to a plane which is defined by the reflective imaging element 10. Because the liquid crystal display panel 20A is thus inclined, the optical system 100A is able to display an airy image.

As shown in FIG. 1(b), the viewing angle dependence of the contrast ratio of the liquid crystal display panel 20A is adjusted so that a central value exists in a direction inclined by 10° or more in the direction of tilt of the display surface from the normal of the display surface. As a result, the optical system 100A is able to display an airy image with a high display quality.

Figure 2:
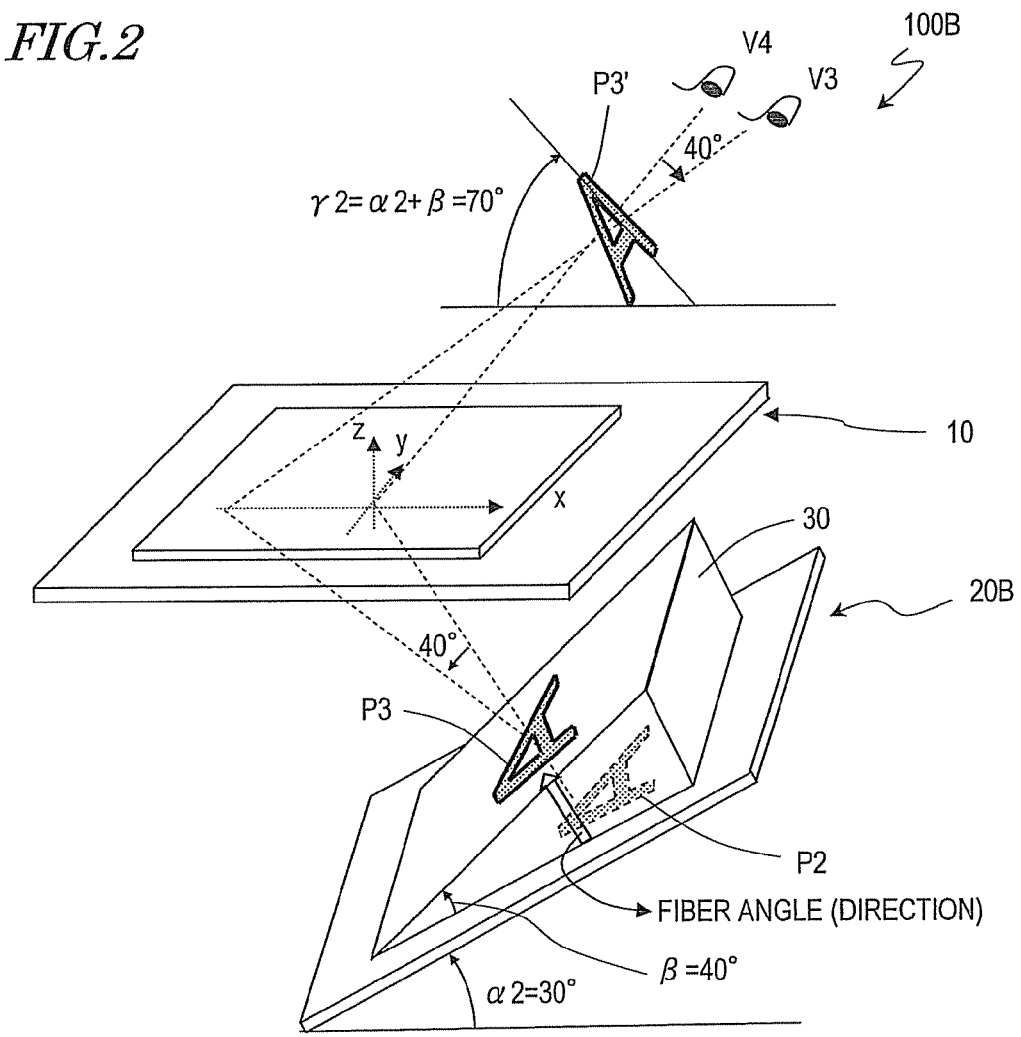
FIG. 2 A schematic perspective view showing the construction of an optical system 100B according to an embodiment of the present invention.

FIG. 2 shows the construction of an optical system 100B according to another embodiment of the present invention.

The optical system 100B shown in FIG. 2 includes a reflective imaging element 10, a liquid crystal display panel 20B disposed on a light-incident side of the reflective imaging element 10, and a light guide element 30. The reflective imaging element 10 has a construction as shown in FIG. 3, for example, and allows an image which is displayed on an outgoing face of the light guide element 30 to form an image at a position of planar symmetry with respect to the reflective imaging element 10 as a plane of symmetry.

The liquid crystal display panel 20B is disposed so that its display surface is inclined with an angle of no less than 15° and no more than 30° relative to a plane defined by the reflective imaging element 10 (which, for example, may be parallel to the horizontal plane as shown in the figure). Unlike in the liquid crystal display panel 20A of the optical system 100A shown in FIG. 1, the viewing angle dependence of the contrast ratio of the liquid crystal display panel 20B is such that a central value exists in the normal direction of the display surface or in a direction inclined by more than 0° but less than 10° in the direction of tilt of the display surface from the normal direction (see FIG. 5(b)). The liquid crystal display panel 20B is a commonly-used transmissive-type TN liquid crystal display panel, and includes a TN liquid crystal cell and two polarizers disposed in crossed Nicols with the liquid crystal cell interposed therebetween. The TN liquid crystal cell has an amorphous silicon TFT for each pixel; the liquid crystal layer has a thickness of about 5 μm; and a 90° twist alignment is maintained by alignment films which have been subjected to a rubbing treatment. The liquid crystal material is a commercially-available nematic liquid crystal material for use in TN applications.

The light guide element 30 is a fiber plate (also known as a fiber faceplate), for example, and has an incident face, an outgoing face, and a plurality of light paths (not shown) formed between the incident face and the outgoing face. The incident face of the light guide element 30 is disposed on the reflective imaging element 10 side of the display surface of the liquid crystal display panel 20B, and the outgoing face is inclined with an angle of no less than 45° and no more than 75° relative to a plane defined by the reflective imaging element 10 (which, for example, may be parallel to the horizontal plane as shown in the figure). By displaying an image on the inclined outgoing face of the light guide element 30 as such, the optical system 100B is able to display an airy image.

Before describing the principles by which the optical systems 100A and 100B of the embodiment are able to display an airy image, the construction and action of the reflective imaging element 10, and the problems of an optical system 200 of Comparative Example including the reflective imaging element 10 and a conventional commonly-used liquid crystal display panel 20B, will be described with reference to FIG. 3 to FIG. 5.

FIGS. 3(a) and (b) are diagrams showing the construction of the reflective imaging element 10, where FIG. 3(a) is a schematic front view, and FIG. 3(b) is a schematic perspective view in which portion C in FIG. 3(a) is enlarged. The reflective imaging element 10 is described in Patent Document 1.

As shown in FIG. 3(a), the reflective imaging element 10 has a multitude of holes 12 penetrating through the plate-like substrate 11 in the thickness direction. The shape of each hole 12 as viewed from the normal direction of the substrate 11 is essentially a rectangle (essentially a square).

As shown in FIG. 3(b), two specular elements 14a and 14b which are orthogonal to each other are formed on the inner wall surfaces of each hole 12, such that each hole 12 functions as a unit imaging element 13. The other two faces among the inner wall surfaces of each hole 12 may be non-mirror finished faces which do not reflect light, or, as shown in FIG. 4, have subdued reflection by virtue of an angle θa (e.g., 18°) or the like. In the unit imaging elements 13 shown in FIG. 4, L1 is about 150 μm; L2 is about 49 μm (=tan 18°×150 μm); L3 is about 10 μm; D1 is about 150 μm; and θa is about 18 degrees, for example.

Figure 4:
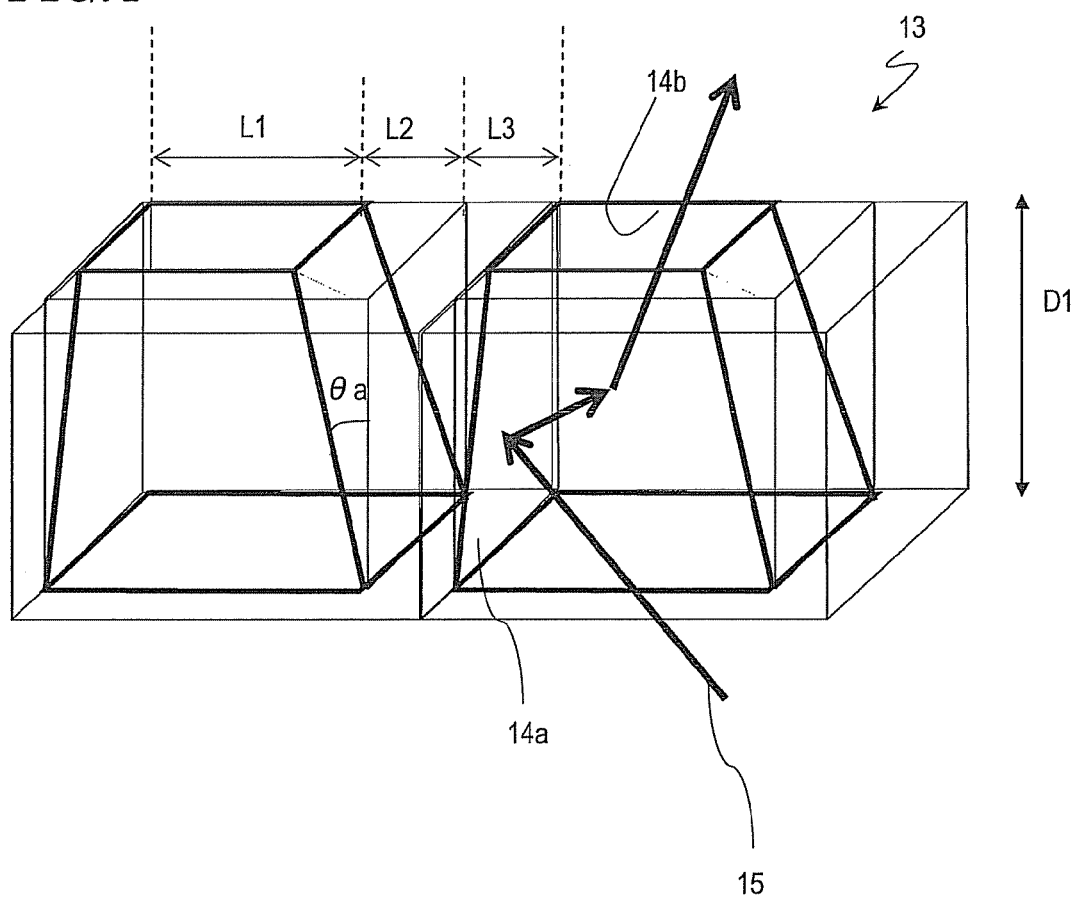
FIG. 4 A schematic diagram showing the structure of unit imaging elements 13 and a light path.

When light from an object enters the reflective imaging element 10, as indicated by arrows 15 in FIG. 4, the light is reflected by the mutually-orthogonal specular elements 14a and 14b of each unit imaging element 13, such that an image of the object is formed at a position of planar symmetry with respect to the reflective imaging element 10 as a plane of symmetry.

With reference to FIGS. 5(*a*) and (*b*), problems of the optical system 200 (Comparative Example) having a conventional commonly-used liquid crystal display panel 20B will be described. FIG. 5(*a*) is a schematic side view showing the construction of the optical system 200, and FIG. 5(*b*) is an equicontrast-ratio line diagram showing the viewing angle characteristics of the commonly-used liquid crystal display panel 20B included in the optical system 200.

FIG. 5(*b*) is an equicontrast-ratio line diagram showing the viewing angle characteristics of the commonly-used TN liquid crystal display panel 20B. Concentric circles indicate polar angles (angles from the display surface normal) in the viewing direction. Pretending that the display surface is a clock face, the azimuth of the viewing direction should read as follows: the right direction on the display surface is 3 o'clock; the left direction is 9 o'clock; the upper direction is 12 o'clock; and the lower direction is 6 o'clock.

In FIG. 5(*b*), CR1 denotes a region with a contrast ratio of 100:1; CR2 denotes a region with a contrast ratio of 50:1; and CR3 denotes a region with a contrast ratio of 10:1; and CR4 denotes a grayscale inversion region. From this figure, the viewing angle dependence of the contrast ratio of the liquid crystal display panel 20B is such that the contrast ratio takes a maximum value in the normal direction of the display surface, and has its central value in a direction slightly (less than 10°) inclined in the 6 o'clock direction from the normal direction of the display surface. Note that a central value is defined by a point having a contrast ratio of 10:1 or more, such that the contrast ratio undergoes little change when the viewing angle is varied in any direction. The liquid crystal display panel 20B is a typical TN liquid crystal display panel having its positive viewing angle direction in the 6 o'clock direction. When the viewing angle is tilted in the 6 o'clock direction so as to result in a polar angle of about 30 degrees or more (CR4 region), a grayscale inversion (inversion between negative and positive) will occur.

As shown in FIG. 5(*a*), when the liquid crystal display panel 20B (broken line) is placed at a position P5 with a shallow tilting angle, an aerial image will form at a position P5' of planar symmetry with respect to the reflective imaging element 10 as a plane of symmetry. The contrast ratio of the liquid crystal display panel 20B takes a maximum value in the normal direction of the display surface, as indicated in FIG. 5(*b*). Therefore, as shown in FIG. 5(*a*), the aerial image formed at the position P5' will be observed with a highest contrast ratio when observed from a viewing point V5.

Now, if the angle of inclination of the liquid crystal display panel 20B is increased (e.g., α1=70° in FIG. 1(*a*)) at a position P4 in order to enhance airiness, the aerial image formed at a position P4' must be observed from a viewing point V6 in order for it to be observed with the highest contrast ratio. In other words, the viewing point needs to be receded from V5 to V6, thus shallowing the angle with the reflective imaging element 10. Generally speaking, a viewer is likely to make an observation from a direction which is perpendicular to the display surface or slightly inclined therefrom in the 6 o'clock direction (it is for this reason that the liquid crystal display panel 20B is designed so as to have the viewing angle characteristics shown in FIG. 5(*b*)). In the optical system 200, since the plane defined by the reflective imaging element 10 is the closest physical face (that can be regarded as a display surface) to the viewer, if the angle with the reflective imaging element 10 becomes shallow, the viewer will experience difficulty in observation. On the other hand, if the aerial image formed at the position P4' is observed from the viewing point V5, the liquid crystal display panel 20B is being observed from a viewing point which is inclined in the 6 o'clock direction, which induces grayscale inversion (see the region CR4 in FIG. 5(*b*)).

If the distance between the reflective imaging element 10 and the liquid crystal display panel 20B is increased, the position P4' at which the aerial image forms will be moved away from the reflective imaging element 10, so that the viewing angle (polar angle) with respect to the aerial image can be decreased even when the viewing is done from the same viewing point V5. However, increasing the distance between the reflective imaging element 10 and the liquid crystal display panel 20B results in a problem of the optical system 200 becoming larger. The increased optical path will also result in the problem of a poorer definition of the aerial image.

Referring back to FIGS. 1(*a*) and (*b*), the structure and operation of the optical system 100A according to an embodiment of the present invention will be described in detail.

As described earlier, the optical system 100A shown in FIG. 1(*a*) includes the reflective imaging element 10 and the liquid crystal display panel 20A disposed on the light-incident side of the reflective imaging element 10. The liquid crystal display panel 20A is disposed so that its display surface is inclined with an angle of no less than 45° and no more than 75° relative to a plane defined by the reflective imaging element 10.

As shown in FIG. 1(*b*), the viewing angle dependence of the contrast ratio of the liquid crystal display panel 20A is adjusted so that a central value exists in a direction inclined by 10° or more in the direction of tilt of the display surface (which herein is the 6 o'clock viewing angle direction) from the normal of the display surface. The central value of the viewing angle dependence of the contrast ratio of the liquid crystal display panel 20A is generally in the 6 o'clock direction, with a polar angle of about 14°. Moreover, in the 6 o'clock direction, the contrast ratio is 50 or more up to a polar angle of about 36° (region CR2). The grayscale inversion region CR4 does not appear until the polar angle in the 6 o'clock direction reaches about 60°.

As shown in FIG. 1(*a*), a case will be described where text character A is displayed on the liquid crystal display panel 20A being disposed at a position 21 on the light-incident side of the reflective imaging element 10. The liquid crystal display panel 20A is disposed so that its display surface is inclined with an angle of 70° (angle of inclination α1=70° relative to a plane defined by the reflective imaging element 10 (the horizontal plane in the figure). A shorter side of the liquid crystal display panel 20A that is located close to the reflective imaging element 10 corresponds to the lower side of the displayed image, and an aerial image which is formed at a position P1' of planar symmetry with respect to the reflective imaging element 10 has its lower side close to the reflective imaging element 10. Since the angle of inclination α1

(which reads positive counterclockwise) of the liquid crystal display panel 20A is equal to the angle of inclination γ1 (which reads positive clockwise) of the aerial image (i.e., the relationship γ1=α1 holds), as the angle of inclination α1 of the liquid crystal display panel 20A increases, the angle of inclination γ1 of the aerial image increases, whereby an aerial image with more airiness can be displayed. It is preferable that the angle of inclination α1 is in a range from 45° to 75°. If it is smaller than 45°, sufficient airiness cannot be obtained. On the other hand, if it exceeds 75°, the aerial image becomes difficult to observe.

Since the liquid crystal display panel 20A has the viewing angle characteristics shown in FIG. 1(b), even if the aerial image forming at a position P1' in FIG. 1(a) is observed from a viewing point V1, an aerial image having a contrast ratio of 10 or more (the contrast ratio being near 50) can be observed. In other words, observing the aerial image from the viewing point V1 corresponds to observing the image displayed on the liquid crystal display panel 20A being at the position P1 with a viewing angle which is inclined by 40° in the 6 o'clock direction (with a polar angle θ=40°), and as can be seen from the viewing angle characteristics of FIG. 1(b), the contrast ratio in that case is near 50. At viewing angles at which the commonly-used TN liquid crystal display panel 20B shown in FIG. 5(b) would fall in the grayscale inversion region CR4, the liquid crystal display panel 20A is able to perform displaying with a contrast ratio of 10 or more. As a result, the optical system 100A is able to display an airy image with a high display quality.

Using the commonly-used TN liquid crystal cell which is included in the aforementioned conventional liquid crystal display panel 20B, the liquid crystal display panel 20A having the viewing angle characteristics shown in FIG. 1(b) is obtained by employing optical compensation films (wide viewing angle films) and a lens film as follows. In the respective interspaces between a pair of polarizers (placed in crossed Nicols) sandwiching the TN liquid crystal cell and that TN liquid crystal cell, wide viewing angle films (WVA02B: manufactured by FUJIFILM Corporation) of the GRP (Gradual Refraction Polarizer, Sharp Technical Journal No. 85, pp. 19-23, April 2003) type are placed. Further on the viewer-side surface, a lens film (IDFII20) manufactured by Sumitomo 3M Limited is stacked. Herein, by using a wide viewing angle film WVA02B having an angle of inclination of 21.4° and a retardation of 103 nm as the wide viewing angle film, and by using a lens film (IDFII20) which causes the peak of outgoing light to be inclined by about 20° from the normal direction of the display surface, viewing angle characteristic as shown in FIG. 1(b) are obtained.

Preferably, the intensity distribution of displaying light going out from the liquid crystal display panel 20A is adjusted so that a maximum value exists in a direction inclined by 10° or more in the direction of tilt of the display surface from the normal of the display surface (i.e., near the central value of viewing angle characteristics). Since the liquid crystal display panel 20A is a transmissive liquid crystal display panel, the above intensity distribution can be obtained by adjusting the intensity distribution of the backlight. The backlight includes a cold cathode fluorescent lamp and any of various optical sheets, and the backlight intensity distribution can be adjusted by using a known optical sheet, e.g., a lens film (IDFII20) manufactured by Sumitomo 3M Limited.

As the liquid crystal display panel 20A, the aforementioned TN liquid crystal display panel is preferable. Although a liquid crystal display panel having a wide viewing angle, e.g., a VA (Vertical Alignment)-type liquid crystal display panel or an IPS (In-Plane Switching)-type liquid crystal display panel, may be used, those are more expensive than TN types. As will be understood from the above description, the liquid crystal display panel 20A is not required to have wide viewing angle characteristics, but it suffices if the liquid crystal display panel 20A has a high display quality (e.g., contrast ratio) in specific directions. In the case of using a wide viewing angle-type liquid crystal display panel such as a VA type or an IPS type, rather, modifications such as employing a backlight with a high directivity would be preferable, so that displaying light not pertaining to the necessary viewing angle will not become stray light.

Next, the structure and operation of the optical system 100B according to another embodiment of the present invention shown in FIG. 2 will be described in detail.

As described above, the optical system 100B shown in FIG. 2 includes the reflective imaging element 10, the liquid crystal display panel 20B disposed on the light-incident side of the reflective imaging element 10, and the light guide element 30. The liquid crystal display panel 20B is disposed so that its display surface is inclined with an angle of no less than 15° and no more than 30° relative to a plane defined by the reflective imaging element 10 (which, for example, may be parallel to the horizontal plane as shown in the figure).

As the liquid crystal display panel 20B, a commonly-used TN liquid crystal display panel can be used. As shown in FIG. 5(b), the viewing angle dependence of the contrast ratio of the liquid crystal display panel 20B is such that a central value exists in the normal direction of the display surface or in a direction inclined by more than 0° but less than 10° in the direction of tilt of the display surface from the normal direction (which is about 5° in the example shown in the figure). The light guide element 30 is a fiber plate, for example, and the incident face of the light guide element 30 is disposed on the reflective imaging element 10 side of the display surface of the liquid crystal display panel 20B, whereas the outgoing face is inclined with an angle of no less than 45° and no more than 75° relative to a plane defined by the reflective imaging element 10. The angle constituted by the incident face and the outgoing face of the light guide element 30 is no less than 15° and no more than 70°, for example.

As shown in FIG. 2, a case will be described where text character A is displayed on the liquid crystal display panel 20B being disposed at a position P2 on the light-incident side of the reflective imaging element 10. One broken line in FIG. 2 represents the normal direction of the display surface of the liquid crystal display panel 20B, while the other broken line represents the normal direction of the outgoing face of the light guide element 30. The fiber plate 30 includes a plurality of fibers arranged in parallel to the normal direction of the display surface, and guides light in that direction.

The liquid crystal display panel 20B is disposed so that its display surface is inclined with an angle of 30° (angle of inclination α2=30°) relative to a plane defined by the reflective imaging element 10 (the horizontal plane in the figure). The incident face of the light guide element 30 is disposed on the reflective imaging element 10 side of the display surface of the liquid crystal display panel 20B, whereas the outgoing face is inclined with an angle of 70° relative to a plane defined by the reflective imaging element 10. The angle β constituted by the incident face and the outgoing face of the light guide element 30 is 40°.

Text character A is displayed on the liquid crystal display panel 20B being disposed at the position P2. A shorter side of the liquid crystal display panel 20B that is located close to the reflective imaging element 10 corresponds to the lower side of the displayed image. Text character A is displayed at a position P3 on a face (outgoing face) of the light guide element 30 facing the reflective imaging element 10. An aerial image which is formed at a position P3' of planar symmetry with respect to the reflective imaging element 10 has its lower side close to the reflective imaging element 10. A sum of the angle of inclination α2 (which reads positive counterclockwise) of the liquid crystal display panel 20B and the angle β (which reads positive counterclockwise) between the incident face and the outgoing face of the light guide element 30 is equal to an angle of inclination γ2 (which reads positive clockwise) of the aerial image (i.e., the relationship γ2=α2+β holds). Therefore, as the angle of inclination α2 of the liquid crystal display panel 20B and the angle β between the incident face and the outgoing face of the light guide element 30 increase, the angle of inclination γ2 of the aerial image increases, whereby an aerial image with more airiness can be displayed.

It is preferable that the angle of inclination α2+β is in a range from 45° to 75°. If it is smaller than 45°, sufficient airiness cannot be obtained. On the other hand, if it exceeds 75°, the aerial image becomes difficult to observe. It is preferable that the sum of α2 and β satisfies the aforementioned range, and that α2 constitutes an angle of no less than 15° and no more than 30°. If α2 exceeds 30°, the display quality is lowered.

Now, a case will be considered where the fiber plate 30 is not included in the optical system 100B shown in FIG. 2.

When the fiber plate 30 is not included, if the aerial image is observed from a viewing point V4, the viewer will be observing the liquid crystal display panel 20B from the normal direction of its display surface. As shown in FIG. 5(b), the liquid crystal display panel 20B has viewing angle characteristics with a high contrast ratio near the center (region CR1), so that the viewer is able to observe an aerial image having a high contrast ratio. However, since the angle of inclination α2 is as small as 30°, the aerial image has poor airiness.

Then, the angle of inclination α2 of the liquid crystal display panel 20B may be made 70°. In other words, in FIG. 2, the liquid crystal display panel 20B may be tilted by extra 40° (α2=30°±40°) as if the display surface of the liquid crystal display panel 20B is located at the surface of the outgoing face of the fiber plate 30. In this case, the viewing point corresponding to the normal direction of the display surface of the liquid crystal display panel 20B, i.e., the viewing point which would allow the aerial image to be observed with a contrast ratio near the center (region CR1) in FIG. 5(b), would be a viewing point V3, which is 40° lower from the viewing point V4. Observing this aerial image from the viewing point V3 would correspond to observing it from a viewing angle which is inclined by 40 degrees in the 6 o'clock direction from the center in the viewing angle characteristics of FIG. 5(b), i.e., an observation from a viewing angle which is close to the region CR4 where grayscale inversion occurs, thus causing a tremendous difficulty in observation.

On the other hand, when the fiber plate 30 such that β=40° is provided as in the optical system 100B of the embodiment of the present invention, an image is formed on the outgoing face of the fiber plate 30 by light which is emitted in the normal direction of the display surface of the liquid crystal display panel 20B. Therefore, this image, although slightly affected by the fiber plate 30, has a high contrast ratio which is close to the contrast ratio near the center (region CR1) in FIG. 5(b).

Thus, with the use of the light guide element 30 (β=40°, an airy image can be displayed with a high display quality by employing the conventional TN liquid crystal display panel 20B having its central value in the normal direction of the display surface or in a direction inclined by more than 0° but less than 10° in the direction of tilt of the display surface from the normal direction.

Other than fiber plates, the light guide element 30 may be a lens sheet such as a prism, and preferably has an ability to resolve the image which is displayed on the liquid crystal display panel 20B. For example, a fiber plate with a fiber diameter of 6 μm and a resolution of 1021 p/mm (lines pare/mm) can be used. Note that, in order to suppress internal reflection, it is preferable that the liquid crystal display panel 20B and the light guide element 30 are attached together with an adhesive material having a refractive index which is close to the refractive indices of the liquid crystal display panel 20B and the light guide element 30.

With the optical system 100B in which the light guide element 30 such as a fiber plate is employed for the liquid crystal display panel 20B having generic viewing angle characteristics (whose optimum viewing angle is in the normal direction of the display surface), an airy image can be displayed with a high display quality.

In the above embodiments, the aerial image only has a tilt in one-dimensional direction. However, this is not a limitation; it may also be tilted in a two-dimensional or three-dimensional manner. In either case, the display quality of the aerial image can be improved by determining the optimum viewing angle characteristics that are required of the display panel from the desired displaying state of any arbitrary aerial image, and by using an optimum display panel.

INDUSTRIAL APPLICABILITY

The present invention is widely applicable to optical systems which have a reflective imaging element capable of forming an image of an object in a space and a liquid crystal display panel.

REFERENCE SIGNS LIST 10 reflective imaging element
11 substrate
12 hole in imaging element
13 unit imaging element
14a, 14b unit imaging element ⊕ specular element
20A, 20B liquid crystal display panel
30 light guide element (fiber plate)
100A, 100B, 200 optical system

The invention claimed is:
1. An optical system comprising:
a reflective imaging element; and
a liquid crystal display panel disposed on a light-incident side of the reflective imaging element, the liquid crystal display panel having a display surface which is inclined with an angle of no less than 45° and no more than 75° relative to a plane defined by the reflective imaging element, a viewing angle dependence of a contrast ratio of the liquid crystal display panel taking a central value in a direction inclined by 10° or more in a direction of tilt of the display surface from a normal of the display surface, wherein
the optical system causes an image displayed on the display surface of the liquid crystal display panel to form an image at a position of planar symmetry with respect to the reflective imaging element as a plane of symmetry.
2. The optical system of claim 1, wherein an intensity distribution of displaying light going out from the liquid crystal display panel takes a maximum value in a direction which is inclined by 10° or more in the direction of tilt of the display surface from the normal of the display surface.

3. The optical system of claim 1, wherein the liquid crystal display panel is a TN liquid crystal display panel.

4. An optical system comprising:

a reflective imaging element;

a liquid crystal display panel disposed on a light-incident side of the reflective imaging element, the liquid crystal display panel having a display surface which is inclined with an angle of no less than 15° and no more than 45° relative to a plane defined by the reflective imaging element, a viewing angle dependence of a contrast ratio of the liquid crystal display panel taking a central value in a normal direction of the display surface or in a direction inclined by more than 0° but less than 10° in a direction of tilt of the display surface from the normal direction; and a light guide element having an incident face, an outgoing face, and a plurality of light paths formed between the incident face and the outgoing face, the incident face being disposed on the reflective imaging element side of the display surface, and the outgoing face being inclined with an angle of no less than 45° and no more than 75° relative to the plane defined by the reflective imaging element, wherein the optical system causes an image displayed on the outgoing face of the light guide element to form an image at a position of planar symmetry with respect to the reflective imaging element as a plane of symmetry.

5. The optical system of claim 4, wherein the light guide element is a fiber plate.

6. The optical system of claim 4, wherein the liquid crystal display panel is a TN liquid crystal display panel.

* * * * *